(12) United States Patent
AbdElHalim Aly Ismail et al.

(10) Patent No.: US 11,694,147 B1
(45) Date of Patent: Jul. 4, 2023

(54) LOCATION CONFIRMATION USING CROWDSOURCED WIRELESS FINGERPRINTS

(71) Applicant: Amazon Technologies, Inc., Seattle, WA (US)

(72) Inventors: HebaAllah Aly AbdElHalim Aly Ismail, Bellevue, WA (US); Zheng Wang, Sammamish, WA (US); Qianchao Ban, Seattle, WA (US); Matthew Kenneth Bellamy, Kirkland King, WA (US); Shao-Wen Yang, Redmond, WA (US); Xingang Guo, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 143 days.

(21) Appl. No.: 16/900,057

(22) Filed: Jun. 12, 2020

(51) Int. Cl.
*G06Q 10/08* (2023.01)
*G06Q 10/083* (2023.01)
*G06Q 10/087* (2023.01)

(52) U.S. Cl.
CPC ......... *G06Q 10/083* (2013.01); *G06Q 10/087* (2013.01)

(58) Field of Classification Search
CPC .. G06Q 10/083; G06Q 10/087; G06F 16/639; G06F 16/29; G06F 16/174; G06F 21/45; G06F 16/217; G06F 11/1461; H04N 21/44; H04N 21/4361; H04N 21/812; H04N 21/44213

USPC ................. 705/333; 455/440, 456.1
See application file for complete search history.

(56) References Cited

U.S. PATENT DOCUMENTS

| | | | |
|---|---|---|---|
| 8,095,756 B1* | 1/2012 | Somavarapu ....... | G06F 11/1461 711/163 |
| 8,169,982 B2* | 5/2012 | Gogic ................. | G01S 5/02524 370/328 |
| 8,483,704 B2* | 7/2013 | Nanda .................. | H04W 48/16 455/456.2 |
| 9,743,233 B1* | 8/2017 | Liu ....................... | H04W 64/00 |
| 10,469,787 B1* | 11/2019 | Dodge ............. | H04N 21/43615 |
| 10,489,368 B1* | 11/2019 | Parkes ................. | G06F 16/217 |
| 11,163,748 B1* | 11/2021 | Cheng ................. | G06F 16/174 |
| 2007/0021126 A1* | 1/2007 | Nanda ................ | H04W 48/16 455/456.1 |

(Continued)

*Primary Examiner* — Olusegun Goyea
(74) *Attorney, Agent, or Firm* — Thomas | Horstemeyer, LLP

(57) ABSTRACT

Disclosed are various embodiments for generating location confirmation models using crowdsourced wireless fingerprints. Wireless fingerprints can be generated and associated with a given location during events that use proximity to specific locations. The wireless fingerprints can be processed to generate location confirmation models that can be used for location confirmation. Periodically, the collected wireless fingerprints can be analyzed and compared to previously collected wireless fingerprints to detect a change in a wireless infrastructure at the given location. Upon determining that a previously generated location confirmation model is invalid according to a level of significance of the change, the outdated wireless fingerprints can be identified and removed from storage or otherwise ignored for future models. An updated location confirmation model can be generated using the up-to-date wireless fingerprints.

20 Claims, 6 Drawing Sheets

(56) References Cited

U.S. PATENT DOCUMENTS

| | | | |
|---|---|---|---|
| 2007/0060130 A1* | 3/2007 | Gogic | H04W 64/00 455/440 |
| 2015/0081583 A1* | 3/2015 | Butler | H04W 4/025 705/333 |
| 2017/0142650 A1* | 5/2017 | Wang | H04B 17/318 |
| 2017/0192545 A1* | 7/2017 | Tian | H04M 1/724 |
| 2017/0272814 A1* | 9/2017 | Chen | H04N 21/812 |
| 2018/0181994 A1* | 6/2018 | Papakostas | H04L 67/535 |
| 2020/0099684 A1* | 3/2020 | Nagaraja | G06F 21/45 |
| 2020/0163041 A1* | 5/2020 | Wirola | H04W 12/63 |

* cited by examiner

LOCATION CONFIRMATION USING CROWDSOURCED WIRELESS FINGERPRINTS

BACKGROUND

In a product fulfillment context, delivery confirmation involves ensuring that ordered items are delivered to the appropriate recipients at their specified delivery location. Lacking an accurate delivery confirmation can cause not only customer frustration (e.g., a customer reports that an item is not received) but also driver frustration (e.g., when a driver is unable to locate a particular location). Delivery agents can use global positioning system (GPS) devices to provide a route to a delivery address provided by the intended recipient. Even with GPS systems, delivery agents can have difficulty identifying the appropriate physical location of the delivery address.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
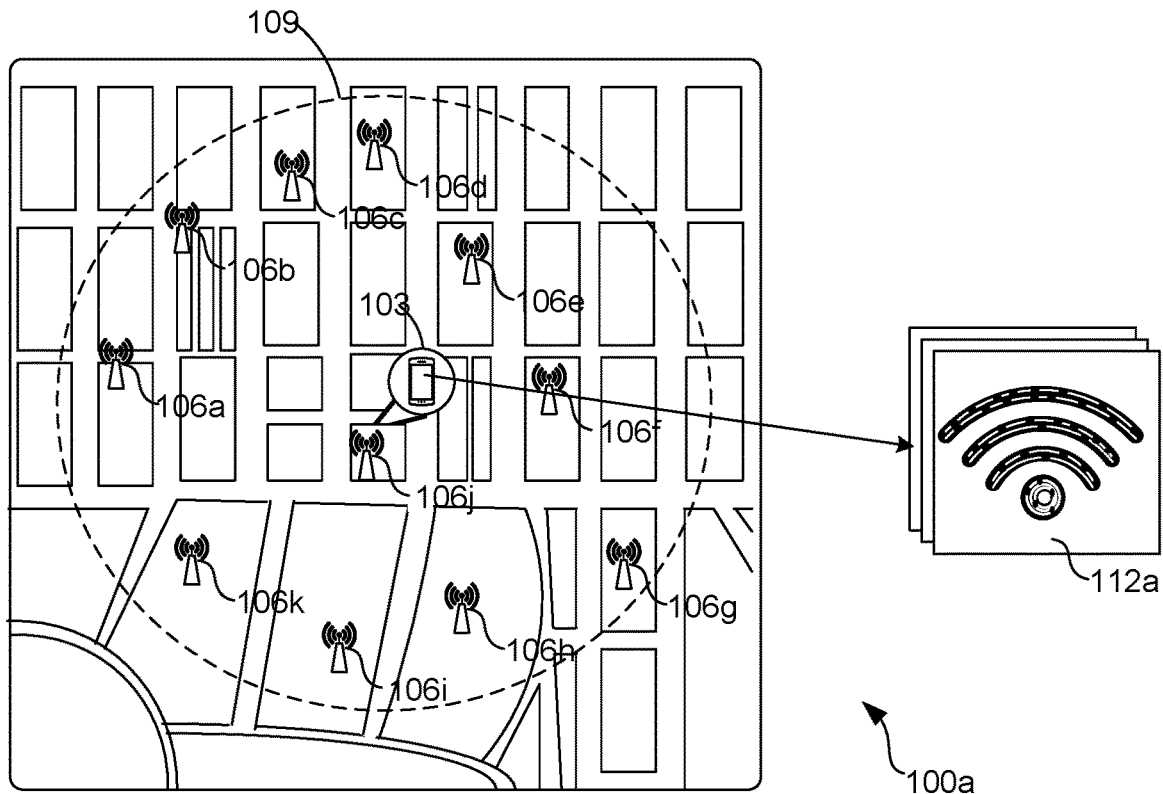
FIGS. 1A and 1B are drawings of example scenarios related to wireless localization according to various embodiments of the present disclosure.

The present disclosure relates to crowdsourcing wireless fingerprints to generate location confirmation models for improving location confirmation accuracy. A wireless fingerprint corresponds to a unique signature for a given location according to attributes of surrounding wireless access point (AP) devices. As such, a wireless fingerprint may be generated using attribute data (e.g., signal strength, distance between devices, a device identifier, a device address, etc.) received from or otherwise associated with the identified AP devices. A device (e.g., mobile phone, delivery scanning device, payment processing reader, etc.) can perform a passive or active wireless scan of a given network (e.g., a wireless fidelity (Wi-Fi) network, a Bluetooth network, a Zigbee network, a Near Field Communication (NFC) network, etc.) to identify access point (AP) devices surrounding a given location.

By being able to crowdsource the wireless fingerprints through multiple types of operational events (e.g., delivery location, payment processing, etc.), changes in a wireless infrastructure that drastically alter a wireless fingerprint model for a given location can be detected in a timely manner. For example, the removal and/or addition of a majority of wireless AP devices that are used to obtain a wireless fingerprint can have a drastic impact on the integrity of a wireless fingerprint for a given location. As such, in accordance to various embodiments, a previously generated wireless fingerprint model for a given location can be considered invalid in response to detecting a substantial change in the wireless infrastructure, and an updated wireless fingerprint model can be generated using fingerprint data collected after the time associated with the detected change.

According to various embodiments of the present disclosure, wireless fingerprints obtained through various operational events (e.g., package delivery, payment processing, etc.) can be used to generate fingerprint models that can be used to improving the accuracy for location confirmation of a given location. In addition, the wireless fingerprints can be analyzed to detect changes that drastically alter a wireless infrastructure in a given area, thereby altering the accuracy of a wireless fingerprint model generated using data obtained prior to the detected change.

Location confirmation determines whether an operation is performed at its expected location. Improving the accuracy of location confirmation can reduce operational errors and fraudulent operations. For example, location confirmation can be used to confirm the location of a package delivery. By preventing delivery defects (e.g., item delivered but not received by the recipient), location confirmation reduces costs involved in remedying the defects and improves customer satisfaction. In another example, location confirmation can be used to confirm the location of purchases and/or payments which can help reduce fraudulent transactions. Additionally, location confirmation can be used as a metric to estimate the likelihood of a legitimate purchase transaction.

GPS represents the de facto standard localization system, and it is the conventional approach for location confirmation. Commonly, if the distance between the GPS current location and the operation's expected location is within a specific distance (i.e., within a geofence), the operation is confirmed. Yet, due to limitations in the operation's expected location type (e.g., urban canyons and indoors), GPS alone cannot provide the essential location granularity or simply is unavailable for location confirmation.

According to various embodiments, the present disclosure relates to a fine-grained location confirmation on a global scale that leverages any existing wireless infrastructure available. Although the discussion in the present disclosure refers primarily to Wi-Fi networks, it should be noted that the examples of the present disclosure can be used with all wireless protocols including, for example, Wi-Fi®, Bluetooth®, Near Field Communication (NFC), Zigbee®, Z-Wave®, 6LoWPAN, Radio Frequency Identification (RFID), cellular 4G networks, cellular 5G networks, and other wireless protocols. For example, the wireless AP devices described herein can comprise a radio frequency (RF) transmitter or other suitable transmitter or transceiver that can be used with any of these wireless protocols.

In particular, the present disclosure leverages existing wireless infrastructure without additional infrastructure deployment. In addition, the present disclosure provides a scalable approach for providing improved accurate location confirmation using wireless localization techniques. To further differentiate, conventional localization products (e.g., GPS) can be used for location confirmation with proximity by comparing geolocations (e.g., latitude, longitude) between expected location and user location. Such solutions are subject to availability of the underlying geolocation product. According to various embodiments, the present disclosure uses existing wireless infrastructure deployment, and may not use proximity or geolocation solutions.

Location confirmation, as well as all wireless localization techniques, includes two phases: the survey phase and the online confirmation phase. In the survey phase, wireless fingerprints are collected from various locations and a machine learning algorithm is applied to generate a fingerprint model for a given location. For example, the surveyed wireless fingerprints may be passively or actively collected from past successful deliveries for each delivery location. In this example, when a delivery agent delivers an item, the delivery agent can interact with a delivery application to confirm that an item was delivered. In response, the delivery application may identify AP devices in the surrounding area to generate a wireless fingerprint that can be used during the survey phase. In another example, a payment device may passively or actively generate wireless fingerprints in response to receiving and/or processing a payment associated with a transaction that occurs at a given device. Although payment processing and item delivery are used as examples of operational events that correspond to the collection of wireless fingerprints, other types of operational events that occur relative to a given location can be used to actively or passively collect wireless fingerprints, as can be appreciated.

In the online confirmation phase, a wireless fingerprint is collected from a wireless scan when the transporter (e.g., scanning device) arrives at the given location (e.g., delivery destination). The transporter's real-time wireless fingerprint is compared against the fingerprint model or location confirmation model for the target delivery location. The comparison result can be used to confirm if the destination location of the transporter is the targeted delivery location. Various approaches related to location confirmation are described in U.S. patent application Ser. No. 16/900,004, entitled "WIRELESS FINGERPRINT RECONSTRUCTION FOR ACCURATE LOCATION CONFIRMATION," filed Jun. 12, 2020, which is incorporated by reference herein in its entirety.

Figure 1B:
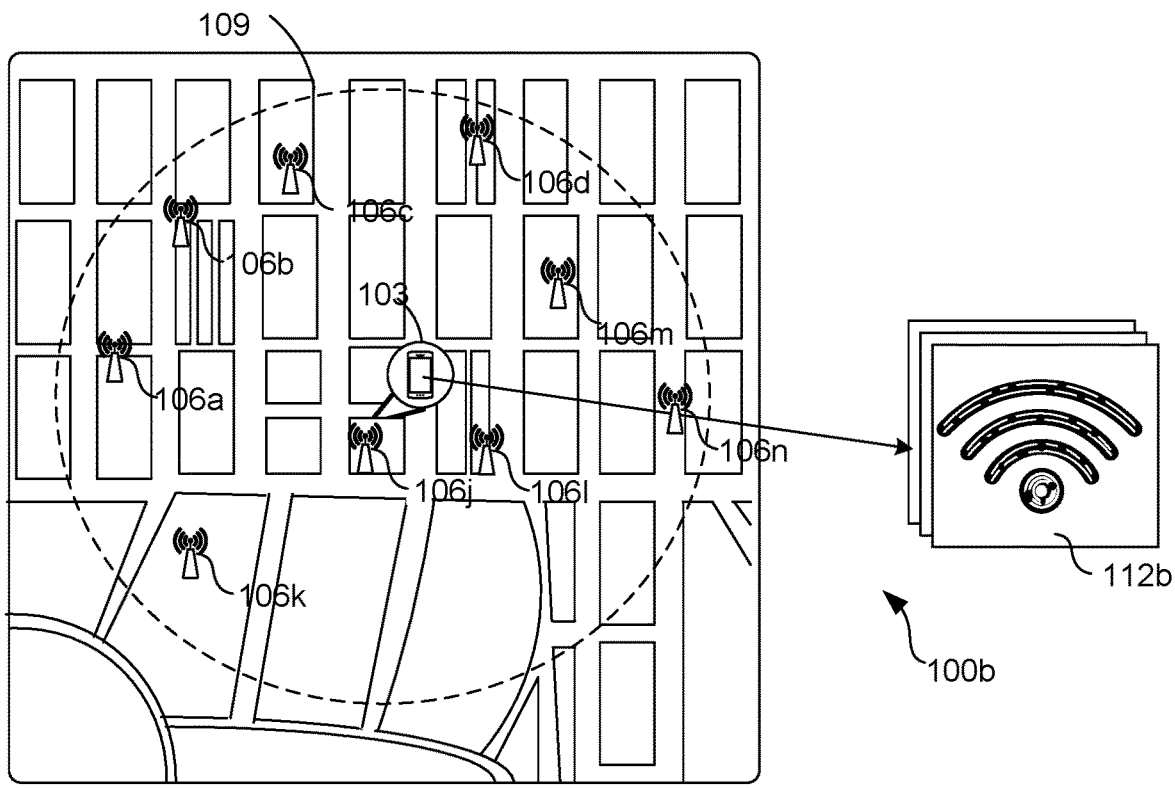

Turning now to FIGS. 1A and 1B, shown are example scenarios 100 (e.g., 100a, 100b) related to improved location confirmation for a given location using a client device 103 in accordance to the embodiments of the present disclosure. In particular, FIGS. 1A and 1B illustrate how a change in the wireless infrastructure over time can affect the wireless fingerprint model that can be used for location confirmation. Further, FIGS. 1A and 1B illustrate how crowdsourced data can be used to detect the change such that up-to-date wireless fingerprints can be generated and used for improved accurate location confirmation.

In particular, FIG. 1A illustrates multiple wireless AP devices 106 (e.g., 106a, 106b, 106c, 106d, 106e, 106f, 106g, 106h, 106i, 106j, and 106k) positioned in various locations within a surrounding area 109 of the location of the client device 103. In contrast, FIG. 1B illustrates a different set of wireless AP devices 106 (e.g., 106a, 106b, 106c, 106d, 106j, 106k, 106l, 106m, and 106n) positioned in various locations within a surrounding area 109 of the location of the client device 103. In particular, FIGS. 1A and 1B illustrate a change in the wireless infrastructure for the surrounding area 109 over a period of time. In this example, the change corresponds to the removal and the addition of multiple wireless AP devices.

The example scenarios 100 of FIGS. 1A and 1B can be used to illustrate both the survey phase and the online confirmation phase associated with wireless localization techniques (e.g., location confirmation), and how the data collected through the survey phase can affect the accuracy of the generated location confirmation model that is used for location confirmation. For purposes of discussion, the location confirmation for the given location is associated with a delivery of an item to a given mailing address. The collection of wireless fingerprints 112 (e.g., 112a, 112b) obtained during the survey phases can correspond to data collected from deliveries, payment transactions, and/or other types of operational events that can be correlated to the given location during the occurrence of the event.

To begin, a crowdsourcer is an entity that uses a service that has one or more operational events that may use proximity to specific locations. During the survey phase, the service opportunistically collects a time-stamped wireless fingerprint 112 and uploads the wireless fingerprint 112 to the backend server whenever the crowdsourcer completes an event along with the event's expected location (e.g., item delivery, payment processing, etc.). For example, each time a delivery agent delivers an item at a given location or a transaction payment is processed, the corresponding client device 103 can perform an active or passive wireless scan to identify wireless AP devices 106 in the surrounding area 109 and generate a collected wireless fingerprint 112 using the attributes received from each of the collected wireless AP devices 106. For a passive wireless scan, the wireless scan is performed transparently to the crowdsourcer (e.g., delivery agent) such that the crowdsourcer is not required to do anything differently (e.g., interact with user interface of service and actively request a wireless scan).

In particular, upon performing the wireless scan, the wireless fingerprints 112 can be generated according to the obtained signal strength, device identifier, device location, and/or other parameters. Upon generating the wireless fingerprint 112 and associating the wireless fingerprint 112 to a timestamp and the given location or location identifier, the client device 103 can transmit the wireless fingerprint 112 to a back-end system, where the samples of collected wireless fingerprints 112 are used to generate location confirmation models 115 (FIG. 2) (e.g., fingerprint models) that can be used for location confirmation based on wireless fingerprinting techniques.

The online confirmation phase corresponds to the use of the trained location confirmation models 115 to confirm that a particular location is the correct location. Using the example of FIGS. 1A and 1B, a delivery agent, for example, can interact with his or her client device 103 to confirm whether a present location is the accurate delivery location for a delivery of an item. The client device 103 can perform a wireless scan to identify wireless AP devices 106 in the given area. Upon performing the wireless scan, the client device 103 can obtain and/or determine attribute data (e.g., signal strength, device identifier, location of a given wireless AP device 106, a distance between the client device 103 and a given wireless AP device 106, etc.) from the identified AP devices 106 and generate a collected wireless fingerprint 112 for the given location.

Upon generating the wireless fingerprint 112, the client device 103 can compare a previously generated location confirmation model 115 associated with the given location with the generated wireless fingerprint 112 to confirm a delivery location. If the wireless fingerprint 112 is within a threshold of expectation defined by the location confirmation model 115, the delivery location can be confirmed as being accurate. Otherwise, the delivery agent may receive a notification rendered on the client device 103 indicating that the delivery location is incorrect.

However, as changes in the wireless infrastructure for the surrounding area occur over time, as displayed in FIGS. 1A and 1B, the location confirmation model 115 used for location confirmation in the example scenario 100a of FIG. 1A, may be not be as reliable for location confirmation in the example scenario 100b of FIG. 1B. Therefore, as additional samples of wireless fingerprints 112 are collected through crowdsourcing, the wireless fingerprints 112 can be compared to one another to detect significant changes (e.g., addition of multiple AP devices 106, removal of the majority of AP devices 106, etc.) in the wireless infrastructure that may affect the integrity of the location confirmation models 115. In some cases, an addition and/or deletion of one or more AP devices 106 may not alter the location confirmation model 115 in a way that renders location confirmation as unreliable for location confirmation purposes. However, a drastic change in the wireless infrastructure may affect the overall integrity of the collected wireless fingerprints thereby rendering a previously generated location confirmation model 115 invalid.

In some examples, as the crowdsourced wireless fingerprints 112 are analyzed overtime, a score can be generated and assigned to a location confirmation model 115 based at least in part on the comparison of wireless fingerprints 112. If the score fails to meet or exceed a predefined threshold, the location confirmation model 115 may be determined to be invalid. In this situation, the wireless fingerprints 112 that were obtained prior to the detected change can be discarded as the data is determined to be unreliable, and an updated location confirmation model 115 can be generated using at least a subset of the remaining wireless fingerprints 112 that were obtained after the detected change. With this understanding, the location confirmation model 115 that may be used for location confirmation in FIG. 1B may differ from the location confirmation model 115 used for location confirmation in FIG. 1A. In the following discussion, a general description of the system and its components is provided, followed by a discussion of the operation of the same.

Figure 2:
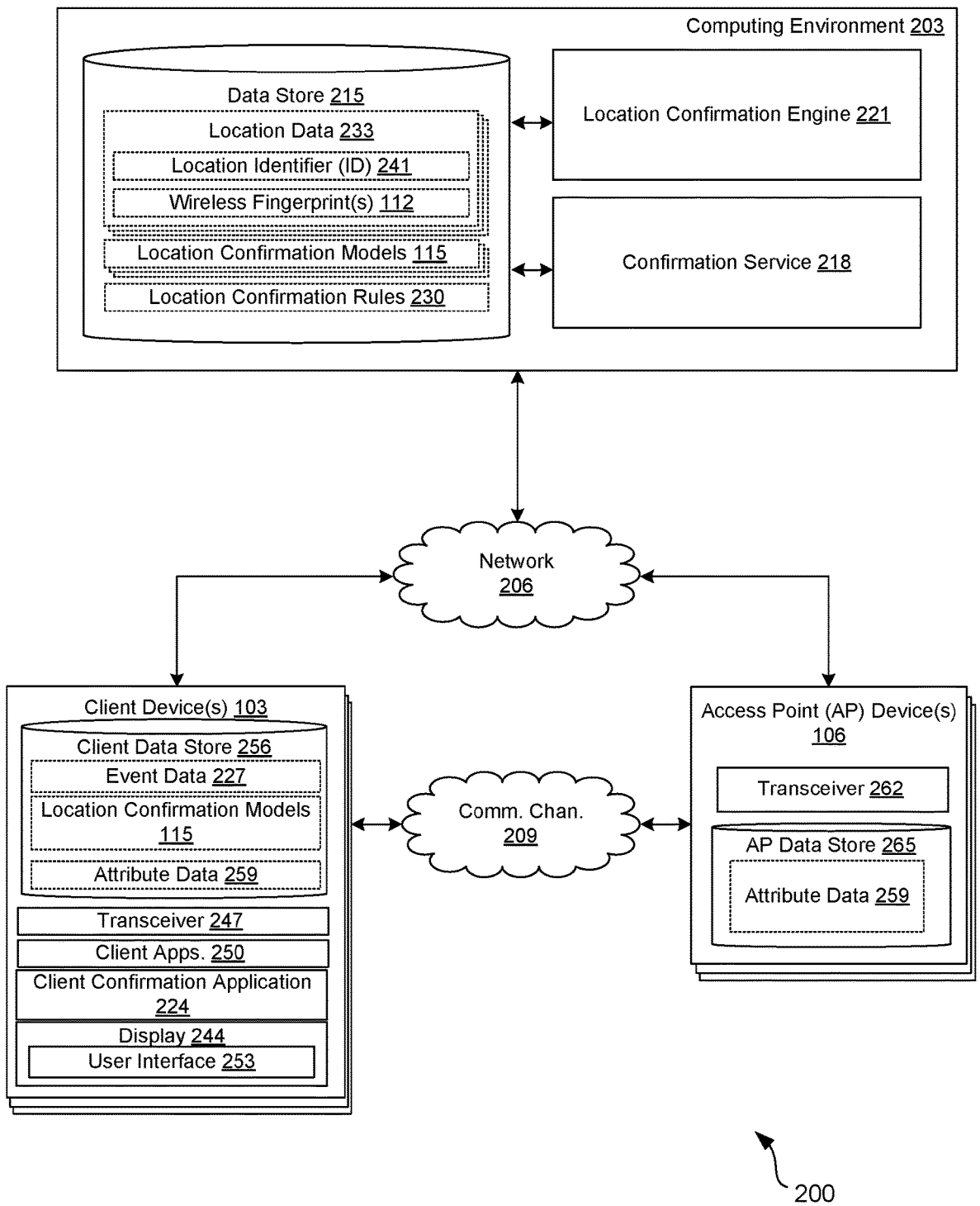
FIG. 2 is a schematic block diagram of a networked environment according to various embodiments of the present disclosure.

With reference to FIG. 2, shown is a networked environment 200 according to various embodiments. The networked environment 200 includes a computing environment 203, a client device(s) 103, and one or more wireless AP devices 106 which are in data communication with each other via a network 206. The network 206 includes, for example, the Internet, intranets, extranets, wide area networks (WANs), local area networks (LANs), wired networks, wireless networks, cable networks, satellite networks, or other suitable networks, etc., or any combination of two or more such networks.

Additionally, the client device 103 and the wireless AP devices 106 may be in data communication with each other via a communication channel 209. In some respects, the communication channel 209 can represent a direct peer-to-peer communication channel between the client device 103 and one or more wireless AP devices 106. In some examples, the communication channel 209 can include a Wi-Fi network, a Bluetooth network, a Zigbee network, a Near Field Communication (NFC) network, and other suitable wireless protocols. In the context of the present disclosure, the communication channel 209 can also be referred to as a network for data communications.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include a confirmation service 218, a location confirmation engine 221, and other applications, services, processes, systems, engines, or functionality not discussed in detail herein.

The confirmation service 218 is executed to interact with a client confirmation application 224 executed on the client device 103 to validate or otherwise confirm that an entity associated with the client device 104 is at a correct location. For example, the confirmation service 218 can interact with the client confirmation application 224 associated with client device 103 of a delivery agent to confirm that the delivery agent is at the correct delivery location for a delivery of an item. In some examples, the confirmation service 218 can obtain collected wireless fingerprints 112 that are generated by a client device 103 and store the collected wireless fingerprints 112 in the data store 215 in association with the particular location for use in generating location confirmation models 115. For example, the confirmation service 218 can interact with client devices 103 associated with crowdsourcers to obtain samples of wireless fingerprints 112 that can be used to maintain the integrity of location confirmation models 115 trained for given locations.

The confirmation service 218 can further obtain event data 227 from the client device 103 or other appropriate sources to determine location data related to one or more deliveries of items associated with the delivery agent for a given period of time. The location data can include a street address, geographic coordinates, a geo-fence boundary, and other location-identifying information. The confirmation service 218 can identify generated location confirmation models 115 according to the identified locations in the event data 227 and transmit the identified location confirmation models 115 to the client device 103. As such, the client device 103 can use the location confirmation models 115 for location confirmation.

The location confirmation engine 221 is executed to generate location confirmation models 115 for a given location using machine learning algorithms and other models or rules included in the location confirmation rules 230. In particular, the location confirmation engine 221 applies the location confirmation rules 230 and uses the crowdsourced wireless fingerprints 112 to generate location confirmation models 115 that include fingerprint models for a given location. According to various embodiments, the generated location confirmation models 115 can be used to confirm locations associated with a delivery.

The location confirmation engine 221 can further detect significant changes in a wireless infrastructure that can invalidate a previously generated location confirmation model 115 for a given location. For example, the location confirmation engine 221 can compare wireless fingerprints with one another. Based at least in part on the comparison, the location confirmation engine 221 can determine if a change has occurred that affects the overall integrity of some of the wireless fingerprints and/or the previously generated location confirmation model 115. By analyzing the wireless fingerprints 112 and detecting a significant change that invalidates a previously generated location confirmation model 115, the location confirmation engine 221 can remove or otherwise ignore the obsolete wireless fingerprints 112 that were collected prior to the detected change to ensure that the location confirmation model 115 for a given location is current and valid.

The data stored in the data store 215 includes, for example, location data 233, location confirmation models 115, location confirmation rules 230, and potentially other data.

The location data 233 can include information associated with a given location associated with a location identifier (ID) 241. The location identifier 241 can include a street address, a room in a building, an apartment, geographic coordinates, a geo-fence boundary, and/or other location-identifying information. In some examples, the location identifier 241 can correspond to a given location associated with a given address. For example, the location identifier 241 can correspond to an apartment number in an apartment complex, a front door of a given address, a back door of a given address, a garage location for a given address, and/or other location as can be appreciated. The location data 233 can further include the samples of collected wireless fingerprints 112 obtained from the client devices 103 at the given location.

The location confirmation models 115 include models generated by the location confirmation engine 221 for different locations. In particular, the location confirmation models 115 include fingerprint models that are generated according to various machine learning techniques defined by the location confirmation engine 221. According to various embodiments, the location confirmation models 115 can be compared to at least a subset of the wireless fingerprints 112 collected through the various crowdsourcing techniques discussed herein. If the comparison of a wireless fingerprint 112 generated by a client device 103 with the location confirmation model 115 results in a score that is within a given threshold, the location can be considered to be accurate.

In some embodiments, the location confirmation models 115 can be stored in the data store 215 in association with the location data 233. In other embodiments, the location confirmation models 115 can be stored in the data store 215 separately from the location data 233. In other embodiments, the location confirmation models 115 may be stored in a repository or other data store that is separate from the data store 215.

The location confirmation rules 230 include rules, models, and/or configuration data for the various algorithms or approaches employed by the location confirmation engine 221. For example, the location confirmation rules 230 can include the various models and/or algorithms used by the location confirmation engine 221 in generating location confirmation models 115 for a given location. In addition, the location confirmation rules 230 can include various models and/or algorithms used by the location confirmation engine 221 to process the wireless fingerprints 112 and determine whether a particular location confirmation model 115 and/or any of the wireless fingerprints 112 are obsolete due to a detected change.

The client device 103 is representative of a plurality of client devices that may be coupled to the network 206 and/or the communication channel 209. The client device 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 103 may include a display 244. The display 244 may comprise, for example, one or more devices such as liquid crystal display (LCD) displays, gas plasma-based flat panel displays, organic light emitting diode (OLED) displays, electrophoretic ink (E ink) displays, LCD projectors, other types of display devices, etc.

The client device 103 can also include a radio frequency (RF) transceiver 247 for communicating via the network 206 and/or the communication channel 209. The RF transceiver 247 can be representative of a plurality of different transceivers in the client device 103, such as a Wi-Fi transceiver, a Bluetooth transceiver, Zigbee transceiver, a cellular transceiver, a Near Field Communication (NFC) transceiver, a radio frequency identification (RFID) transceiver, or other suitable transceivers. The client device 103 can also be equipped with a microphone, a speaker, a light emitting device, a location detecting device (e.g. a GPS unit), sensors, and other suitable components for a mobile device.

The client device 103 may be configured to execute various applications such as client application(s) 250, the client confirmation application 224, and/or other applications. The client application(s) 250 may be executed in a client device 103, for example, to access network content served up by the computing environment 203 and/or other servers, thereby rendering a user interface 253 on the display 244. To this end, the client application 250 may comprise, for example, a browser, a dedicated application, etc., and the user interface 253 may comprise a network page, an application screen, etc. The client device 103 may be configured to execute applications beyond the client application 250 such as, for example, email applications, social networking applications, word processors, spreadsheets, and/or other applications.

In some examples, client applications 250 can correspond to crowdsourcing services that are associated with operational events (e.g., item delivery, payment processing, etc.)

indicating a user proximity to a given location. According to various embodiments, crowdsourcing services can actively or passively perform a wireless scan to identify AP devices 106 associated with a given location and generate a wireless fingerprint 112 using the attribute data 259 obtained from the identified AP devices 106. The wireless fingerprints 112 can then be transmitted to the confirmation service 218 or other backend service for generating and updating location confirmation models 115 for the given location.

The client confirmation application 224 can comprise a client application 250 that interacts with the confirmation service 218 in the computing environment 203. For example, the client confirmation application 224 can obtain location confirmation models 115 from the confirmation service 218 for locations defined in the event data 227. In some examples, the client confirmation application 224 can further perform a wireless scan to identify AP devices 106 associated with a given location and generate a wireless fingerprint 112 using the attribute data 259 obtained from the identified AP devices 106. Upon generating the wireless fingerprint 112, the client confirmation application 224 can compare the wireless fingerprint 112 with the obtained location confirmation model 115 for the given location to confirm an accuracy of the client device location.

In addition, in some examples, the client confirmation application 224 can further comprise a crowdsourcing service that actively or passively collects attribute data 259 from identified AP devices 106 and generates wireless fingerprints 112 for different locations. The wireless fingerprints 112 can then be transmitted to the confirmation service 218 and used for generating and updating location confirmation models 115 for the given locations as can be appreciated.

Also, various data is stored in a client data store 256 that is accessible to the client device 103. The client data store 256 may be representative of a plurality of data stores as can be appreciated. The data stored in the client data store 256, for example, is associated with the operation of various applications and/or functional entities described herein. The client data store 256 may store data received from the computing environment 203 and/or the AP device 106, such as event data 227, location confirmation models 115, attribute data 259, and other data as can be appreciated.

The wireless AP device 106 is representative of a plurality of client devices that may be coupled to the network 206 and/or the communication channel 209. In some examples, the wireless AP device 106 may comprise one of the client devices 103 that can be used for location confirmation. The wireless AP device 106 can refer to a network access point that provides the client devices 103 with access to corresponding networks. The wireless AP device 106 may also comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The wireless AP device 106 can also include a transceiver 262 for communicating via the network 206 and/or the communication channel 209. The transceiver 262 can represent a hardware component capable of wired or wireless data communication. The transceiver 262 can be representative of a plurality of different transceivers in the wireless AP device 106, such as an Ethernet transceiver, a Wi-Fi transceiver, a Bluetooth transceiver, Zigbee transceiver, a Near Field Communication (NFC) transceiver, a radio frequency identification (RFID) transceiver or other suitable transceivers.

Also, various data is stored in an AP data store 265 that is accessible to the wireless AP device 106. The AP data store 265 may be representative of a plurality of AP data stores 265 as can be appreciated. The data stored in the AP data store 265, for example, is associated with the operation of the various applications and/or functional entities described herein. The AP data store 265 may include attribute data 259 and other client data. The attribute data 259 can include SSID, BSSID, a location identifier 241, signal strength, type of device, and/or other data.

Figure 3:
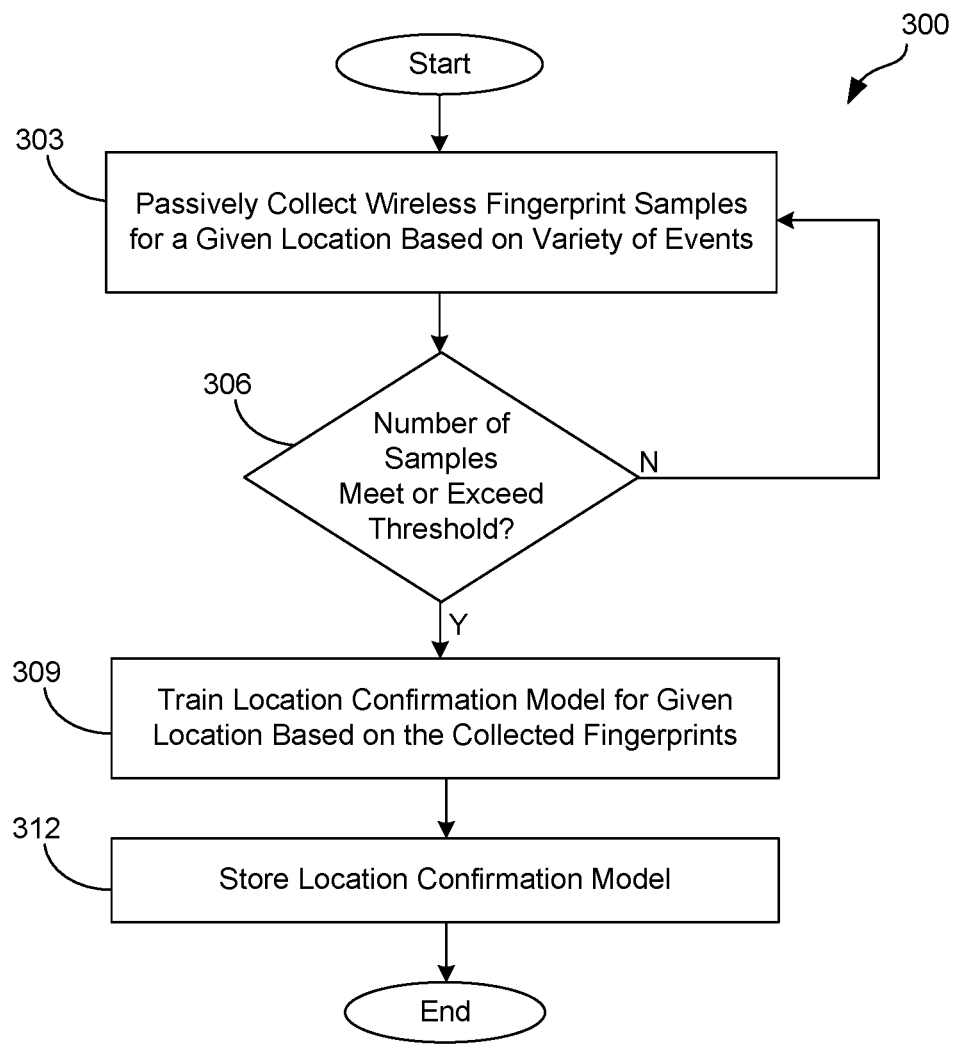
FIGS. 3 and 4 are flowcharts illustrating examples of functionality implemented as portions of a confirmation service and a location confirmation engine are executed in a computing environment in the networked environment of FIG. 2 according to various embodiments of the present disclosure.

Next, a general description of the operation of the various components of the networked environment 200 is provided with reference to FIGS. 3-6. To begin, FIG. 3 illustrates a flowchart 300 that provides one example of the operation of portions of the confirmation service 218 (FIG. 2) and the location confirmation engine 221 (FIG. 2) according to various embodiments. It is understood that the flowchart of FIG. 3 provides merely an example of the many different types of functional arrangements that may be employed to implement the operation of the portions of the confirmation service 218 and the location confirmation engine 221 as described herein. As an alternative, the flowchart of FIG. 3 may be viewed as depicting an example of elements of a method implemented in the computing environment 203 (FIG. 2) according to one or more embodiments.

FIG. 3 provides a non-limiting example of the functionality that may be performed by the confirmation service 218 and the location confirmation engine 221 during the survey phase of wireless localization. Specifically, FIG. 3 provides a non-limiting example of collecting wireless fingerprints 112 (FIG. 1) via crowdsourcing and training location confirmation models 115 (FIG. 2) according to the collected wireless fingerprints 112 (FIG. 2).

At box 303, the confirmation service 218 collects samples of wireless fingerprints 112 according to various embodiments. The wireless fingerprints 112 may be received from one or more client devices 103 (FIG. 1). The client devices 103 are configured to generate the wireless fingerprints 112 using attribute data 259 (FIG. 2) obtained in response to performing a wireless scan. During the wireless scan, the client device 103 obtains attribute data 259 (FIG. 2) from surrounding AP devices 106 (FIG. 1) in the surrounding area 109 (FIG. 1) of the location of the client device 103. For example, crowdsourcing services executed on the client device 103 may generate the wireless fingerprint 112 in response to one or more operational events correlating a user proximity and/or device proximity to a location. For example, wireless fingerprints 112 may be generated by various crowdsourcing services in response to different types of events. The events may relate to an individual arbitrarily walking around the proximity of the target location and using his or her client device 103 to collect the samples, a performance of and/or a recording of a delivery of an item at the target location, a payment related to a transaction, and/or other type of event, as can be appreciated.

The wireless fingerprints 112 can be generated by the client device 103 in response to a passive or active wireless scan. For example, the samples may be collected based at least in part on user interaction with his or her client device 103 such that, a user interaction with a service executing on his or her client device 103 causes an active scan to occur. In other examples, the samples are passively collected in the background without user intervention. In response to generating the wireless fingerprints 112, the client confirmation application 224 (FIG. 2) and/or other client applications 250 (FIG. 2) that correspond to crowdsourcing services can associate generated wireless fingerprints 112 with a given location, and a corresponding timestamp associated with the generation, and/or the collection of the wireless fingerprint 112. In addition, the crowdsourcing services can transmit the collected wireless fingerprints 112 to the confirmation service 218. In various embodiments, the confirmation service 218 stores the received collected wireless fingerprints 112 in the data store 215 (FIG. 2).

The wireless fingerprints 112 are generated using attributes of identified AP devices 106. The attributes can include, for example, the signal strength (e.g., RSSI), a location of the identified AP device 106, a device identifier (e.g., BSSID, SSID), and other attributes as can be appreciated.

At box 306, the location confirmation engine 221 determines if a number of samples collected for a given location meets or exceeds a predefined threshold for generating a location confirmation model 115. For example, assume that the predefined threshold is ten (10) and there are only five (5) collected samples corresponding to the given location. In this situation, the location confirmation engine 221 will be unable to generate a reliable location confirmation model 115 and therefore, will return to box 303 and will continue to collect wireless fingerprints 112 at the given location via crowdsourcing. However, if the number of collected samples meets or exceeds the predefined threshold, the process will proceed to box 309.

At box 309, the location confirmation engine 221 trains a location confirmation model 115 for the given location according to the location confirmation rules 230 (FIG. 2) and crowdsourced wireless fingerprints 112. In various embodiments, the location confirmation model 115 is generated by processing the various wireless fingerprints, identifying and removing outliers included in the received wireless fingerprints, and determining an overall location confirmation model 115 that can be used to improve location confirmation for a location. In particular, the location confirmation model 115 for the given location can be compared to a wireless fingerprint 112 generated during the online phase of wireless localization. If the generated wireless fingerprint 112 generated is determined to be within the parameters defined by the location confirmation model 115, the location can be confirmed as being accurate.

At box 312, the location confirmation engine 221 stores the location confirmation model 115 for the given location in the data store 215. Thereafter, this portion of the process proceeds to completion.

Figure 4:
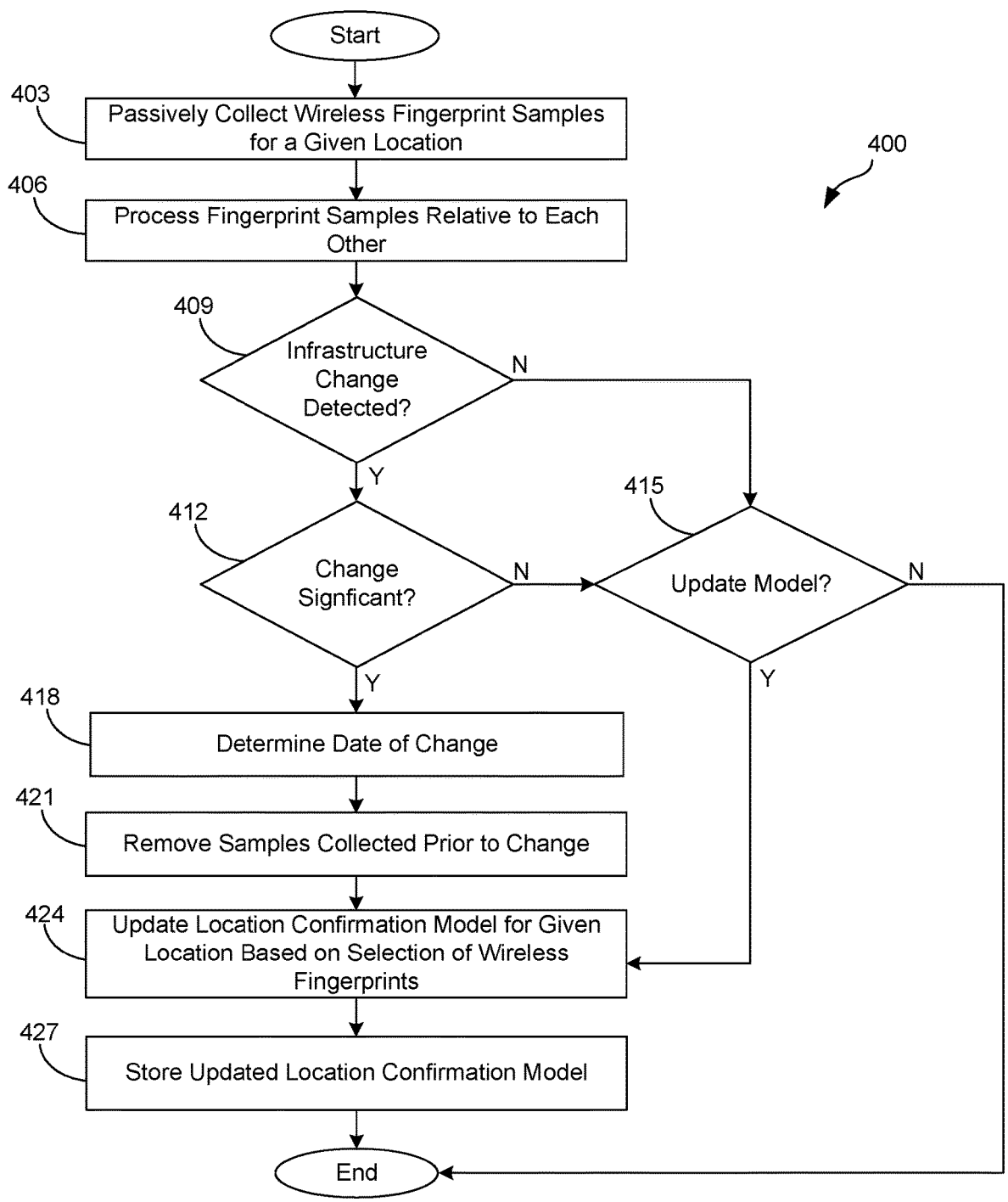

Referring next to FIG. 4, shown is a flowchart 400 that provides one example of the operation of portions of the confirmation service 218 (FIG. 2) and the location confirmation engine 221 (FIG. 2) according to various embodiments. It is understood that the flowchart of FIG. 4 provides merely an example of the many different types of functional arrangements that may be employed to implement the operation of the portions of the confirmation service 218 and the location confirmation engine 221 as described herein. As an alternative, the flowchart of FIG. 4 may be viewed as depicting an example of elements of a method implemented in the computing environment 203 (FIG. 2) according to one or more embodiments.

FIG. 4 provides a non-limiting example of the functionality that may be performed by the confirmation service 218 and location confirmation engine 221 to ensure that the location confirmation models 115 (FIG. 2) associated with a given location remain valid. Specifically, FIG. 4 provides a non-limiting example of detecting a wireless infrastructure change that leads to an update of a location confirmation model 115 for a given location and the removal of obsolete wireless fingerprints 112 (FIG. 2) due to the detected change.

Beginning with box 403, the confirmation service 218 passively collects wireless fingerprint samples associated with a given location. The wireless fingerprints 112 may be received from one or more client devices 103 (FIG. 1). The client devices 103 are configured to generate the wireless fingerprints 112 using attribute data 259 (FIG. 2) obtained in response to performing a wireless scan. During the wireless scan, the client device 103 obtains attribute data 259 (FIG. 2) from surrounding AP devices 106 (FIG. 1) in the surrounding area 109 (FIG. 1) of the location of the client device 103. For example, crowdsourcing services executed on the client device 103 may generate the wireless fingerprint 112 in response to one or more operational events correlating a user proximity and/or device proximity to a location. For example, wireless fingerprints 112 may be generated by various crowdsourcing services in response to different types of events. The events may relate to an individual arbitrarily walking around the proximity of the target location and using his or her client device 103 to collect the samples, a performance of and/or a recording of a delivery of an item at the target location, a payment related to a transaction, and/or other type of event, as can be appreciated.

The wireless fingerprints 112 can be generated by the client device 103 in response to a passive or active wireless scan. For example, the samples may be collected based at least in part on user interaction with his or her client device 103 such that the user interaction with a service executing on his or her client device 103 causes an active scan to occur. In other examples, the samples are passively collected in the background without user intervention. In response to generating the wireless fingerprints 112, the client confirmation application 224 (FIG. 2) and/or other client applications 250 (FIG. 2) that correspond to crowdsourcing services can associate generated wireless fingerprints 112 with a given location, and a corresponding timestamp associated with the generation, and/or the collection of the wireless fingerprint 112. In addition, the crowdsourcing services can transmit the collected wireless fingerprints 112 to the confirmation service 218. In various embodiments, the confirmation service 218 stores the received collected wireless fingerprints 112 in the data store 215 (FIG. 2).

The wireless fingerprints 112 are generated using attributes of identified AP devices 106. The attributes can include, for example, the signal strength (e.g., RSSI), a location of the identified AP device 106, a device identifier (e.g., BSSID, SSID), and other attributes as can be appreciated.

At box 406, the location confirmation engine 221 processes the wireless fingerprint samples relative to one another. For example, the location confirmation engine 221 can analyze the attributes of each received collected wireless fingerprint 112 (FIG. 1). For example, the attributes can include the signal strength (e.g., RSSI), a location of the identified AP device 106, a device identifier (e.g., BSSID, SSID), a timestamp associated with the generation of the wireless fingerprint 112, and other attributes as can be appreciated. The location confirmation engine 221 can further compare the attributes of the AP devices 106 identified in each wireless fingerprint to identify consistencies and outliers in the different wireless fingerprints 112 based at least in part on the comparison.

At box 409, the location confirmation engine 221 can determine if there is an infrastructure change detected for a given area. According to various embodiments, the location confirmation engine 221 employs an algorithm defined by the location confirmation rules 230 (FIG. 2) that analyzes the changes in the visibility of AP devices 106 overtime at each address to detect if the address has undergone a wireless infrastructure change.

According to various embodiments, the location confirmation engine 221 uses a previously trained location confirmation model 115 from the latest samples (M), the crowdsourced wireless fingerprints 112 (F) and returns $d_{change}$ as the date of network change, if any. Afterwards, only wireless fingerprints 112 collected from the $d_{change}$ forward are used by the location confirmation engine 221 to build the location confirmation model 115 to be deployed.

According to various embodiments, for each address, the location confirmation engine 221 takes the model M and its crowdsourced fingerprints F. Then, the location confirmation engine 221 analyzes the visibility of the AP devices 106 in the crowdsourced data. For each fingerprint $f \in F$, $i_f$ is estimated as the number of observed AP devices 106 from the model (Equation (1)) and $u_f$ is estimated as the number of AP devices 106 observed in both the location confirmation model 115 and the wireless fingerprints 112 (Equation (2)). The $i_f$ captures the visibility of the AP devices 106 in the location confirmation model 115 and the removal of the AP devices 106 from the crowdsourced wireless fingerprints 112. On the other hand, the $u_f$ captures the newly observed AP devices 106 in the wireless fingerprints 112 (F) that are not in the model.

$$i_f = \max(M \cap f) \quad \text{Equation (1)}$$

$$u_f = \min(M \cup f) \quad \text{Equation (2)}$$

Afterwards, $i_f$ and $o_f$ are aggregated to understand the reduction in the AP devices' 106 visibility (θ) in the previously generated location confirmation model 115 and the new AP devices 106 visible in the wireless fingerprints 112 (β) over all deliveries. For an aggregation period d, $\theta_d = \text{trimmean}(i_f) \forall_{f \in d}$ and $\beta_d = \text{trimmean}(u_f) \forall_{f \in d}$, a trimmean, i.e. α-trimmed filter with α=30%, to reduce the effect of outliers while doing the aggregation.

A wireless infrastructure change is detected in a period d if there is an increase in $\beta_d$ and a significant drop in $\theta_d$. For example, a wireless infrastructure change can be detected if new AP devices 106 are observed and previously visible AP devices 106 are no longer visible in the fingerprints collected on that period (Equation 3). We normalize $\beta_d$ and $\theta_d$ with $\beta_0$ and $\theta_0$ respectively, i.e. first period values (d=0). Further, the changes in the later periods are also detected.

$$d_{change} = \min_{\frac{\beta_d}{\beta_0} \geq \delta_u \text{ and } \frac{\theta_d}{\theta_0} \leq \delta_l} (d) \quad \text{Equation (3)}$$

Finally, the algorithm outputs $d_{change}$ if it had at least T fingerprints 112. This ensures that the changes in the infrastructure have been observed consistently across multiple events (e.g., deliveries).

If an infrastructure change is detected, the location confirmation engine 221 proceeds to box 412. Otherwise, the location confirmation engine 221 proceeds to box 415.

At box 412, the location confirmation engine 221 determines if the detected change is significant. In particular, the location confirmation engine 221 generates a confidence score associated with the previously generated location confirmation model 115 based at least in part on a comparison of the wireless fingerprints 112. The score can be based at least in part on factors and/or weights that are defined by the location confirmation rules 230. For example, the factors can correspond to the number and/or locations of the AP devices 106 that are newly discovered and/or removed as detected in the discussion of box 409. The location confirmation engine 221 can compare the confidence score with a predefined threshold defined in the location confirmation rules 230 to determine if the change is considered significant. For example, if the confidence score meets or exceeds a predefined threshold, the location confirmation engine 221 may determine that the detected change is significant. If the change is significant, the location confirmation engine 221 proceeds to box 418. Otherwise, the location confirmation model proceeds to box 415.

At box 415, the location confirmation engine 221 determines whether the location confirmation model 115 should be updated. The location confirmation engine 221 can determine that the location confirmation model 115 should be updated in response to determining that the previously trained location confirmation model 115 is outdated, based on a periodic frequency (e.g., daily, weekly, monthly), and/or other factors as can be appreciated. In addition to the discussion with respect to box 409, a previously trained location confirmation model 115 can be considered to be outdated according to an analysis of various factors including, for example, a timestamp associated with the creation of the location confirmation model 115 being outside a predefined threshold, a number of complaints received of incorrect deliveries, and/or other factors. If the confirmation service 218 determines that the location confirmation model 115 should be updated, the confirmation service 118 proceeds to box 424. Otherwise, this portion of the process proceeds to completion.

At box 418, if the infrastructure change is considered to be significant, the location confirmation engine 221 determines the date of the detected change. In particular, the date of the detected change can be determined using the algorithm discussed at box 409. At box 421, upon determining the date of the detected change, the location confirmation engine 221 can discard from the data store 215 any wireless fingerprints 112 having a timestamp that is prior to the detected date of the infrastructure change. As such, the remaining stored wireless fingerprints 112 will correspond to the infrastructure following the detected change.

At box 424, the location confirmation engine 221 updates the location confirmation model 115 for the given location based at least in part on a selection of the wireless fingerprints 112 that are available in the data store 215. In some examples, the location confirmation engine 221 selects a subset of collected wireless fingerprint samples 112 stored in the data store 215. According to various embodiments, the location confirmation engine 221 may select at least a subset of the wireless fingerprints 112 for the given location. The selected wireless fingerprints 112 can be used for updating the location confirmation model 115 for the given location. For example, selection of the wireless fingerprints 112 can be based at least in part on a recency of collection (e.g., timestamps associated with the wireless fingerprints 112), a number of suitable samples, a success of an associated delivery at the given location, and/or other factors. Upon selecting the wireless fingerprints 112, the location confirmation engine 221 updates the location confirmation model 115 for the given location according to the location confirmation rules 236 (FIG. 2) and the selected wireless fingerprints 112.

At box 427, the location confirmation engine 221 stores the location confirmation model 115 for the given location in the data store 215. Thereafter, this portion of the process proceeds to completion.

Figure 5:
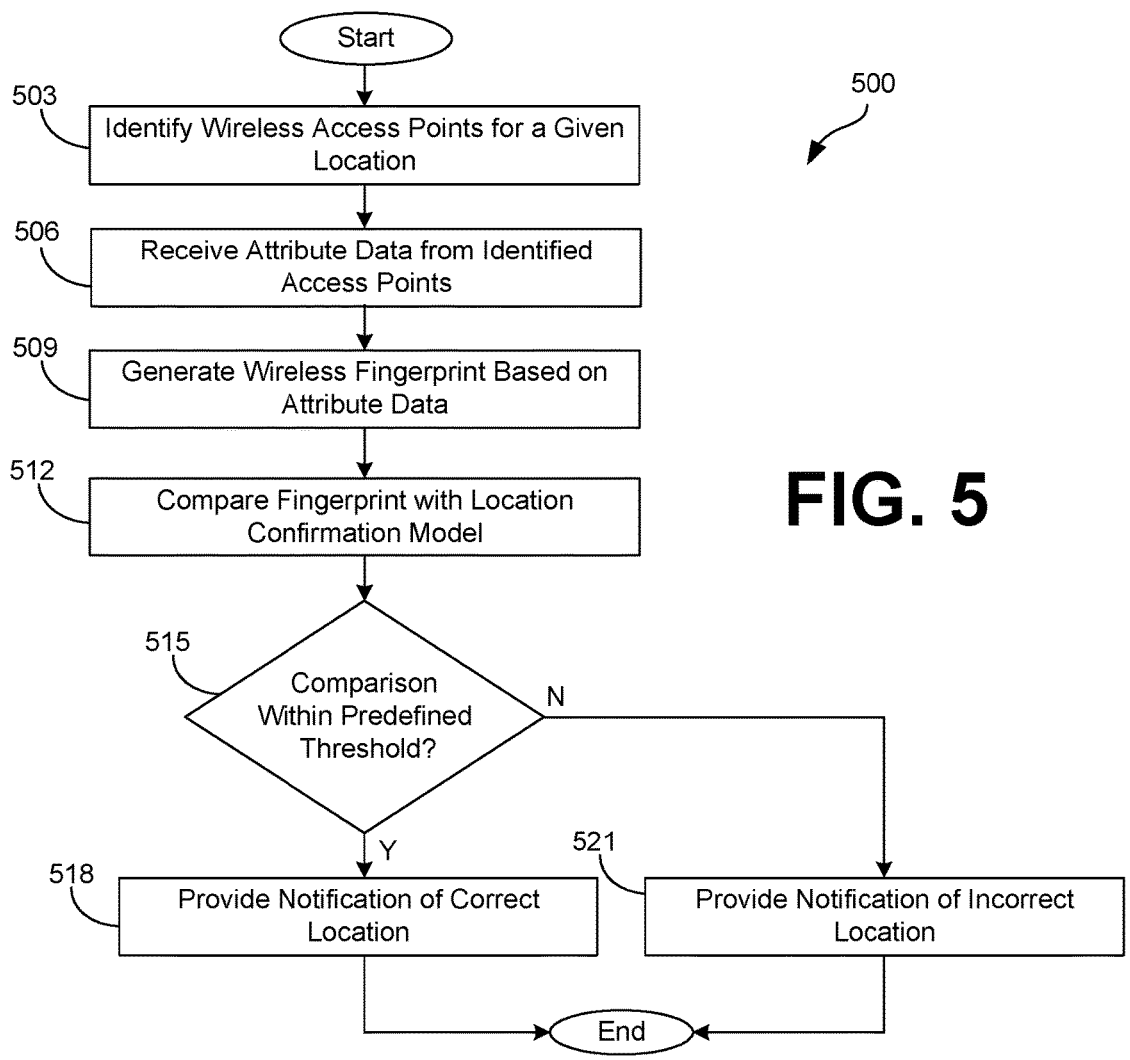
FIG. 5 is a flowchart illustrating one example of functionality implemented as a portion of a client confirmation service is executed in a client device in the networked environment of FIG. 2 according to various embodiments of the present disclosure.

Referring next to FIG. 5, shown is a flowchart 500 that provides one example of the operation of a portion of the client confirmation application 224 (FIG. 2) according to various embodiments. It is understood that the flowchart of FIG. 5 provides merely an example of the many different types of functional arrangements that may be employed to implement the operation of the portion of the client confirmation application 224 as described herein. As an alternative, the flowchart of FIG. 5 may be viewed as depicting an example of elements of a method implemented in the client device 103 (FIG. 1) according to one or more embodiments.

FIG. 5 provides a non-limiting example of the functionality that may be performed by the client confirmation application 224 during the online phase of wireless localization. Specifically, FIG. 5 provides a non-limiting example of generating a wireless fingerprint 112 (FIG. 1) and using a pretrained location confirmation model 115 (FIG. 2) for the given location to confirm accuracy of the location using the generated wireless fingerprint 112.

Beginning with box 503, the client confirmation application 224 can perform a wireless scan (e.g., a Wi-Fi scan) to identify wireless AP devices 106 (FIG. 1) in the surrounding area 109 (FIG. 1). The client confirmation application 224 can perform an active or passive wireless scan to identify AP devices 106 and obtain attribute data 259 (FIG. 2) (e.g., signal strength, a device identifier, AP device location, etc.). For example, in active scanning, the client confirmation application 224 via the transceiver 247 (FIG. 2) can transmit a request for AP devices 106 and then can identify the AP devices 106 in response to received responses. In passive scanning, the client confirmation application 224 via the transceiver 247 may listen for broadcasts from AP devices 106 through different channels.

At box 506, the client confirmation application 224 can obtain the attribute data 259 from the identified AP devices 106. The attribute data 259 (FIG. 2) may be included in the response and/or broadcast received from the AP device 106 upon identification. In some examples, the attribute data 259 is received following an additional request to the identified AP devices 106.

At box 509, the client confirmation application 224 generates a wireless fingerprint 112 using the attribute data 259 obtained from the identified AP devices 106. In particular, the client confirmation application 224 can further associate the wireless fingerprint 112 to a given location via a location identifier 241 (FIG. 2). In addition, a timestamp associated with the performance of the wireless scan and collection of attribute data 259 can be associated with the wireless fingerprint 112.

At box 512, the client confirmation application 224 compares the wireless fingerprint 112 to a trained location confirmation model 115 to determine if the location of the client device 103 (e.g., delivery agent) is correct. In some examples, the client confirmation application 224 can request the location confirmation model 115 for the given location from the confirmation service 218 (FIG. 2). In other examples, the client confirmation application 224 obtains the location confirmation models 115 for all delivery locations for a given time period from the confirmation service 218, in response to providing the confirmation service 218 the event data 227 (FIG. 2) for the given time period.

At box 515, the client confirmation application 224 determines if the comparison is within a predefined threshold that is defined in the location confirmation rules 230 (FIG. 2). For example, the client confirmation application 224 can determine a similarity score generated in response to the comparison of the wireless fingerprint 112 with the location confirmation model 115. If the similarity score is within the predefined threshold defined in the location confirmation rules 230, the location is determined to be correct and the process proceeds to box 518. However, if the similarity score is outside of the predefined threshold, the location may be determined to be incorrect and the process proceeds to box 521.

At box 518, the client confirmation application 224 generates a user interface with a notification indicating that the location is a correct location. Upon generating the user interface, the client confirmation application 224 can cause the user interface to be rendered on the client device 103 to notify the user (e.g., delivery agent) associated with the client device 103, accordingly. Thereafter, this portion of the process proceeds to completion.

At box 521, the client confirmation application 224 generates a user interface including a notification indicating that the location associated with the client device 103 is an incorrect location. Upon generating the user interface, the client confirmation application 224 can cause the user interface to be rendered on the client device 103 to notify the user (e.g., delivery agent) associated with the client device 103, accordingly. Thereafter, this portion of the process proceeds to completion.

Figure 6:
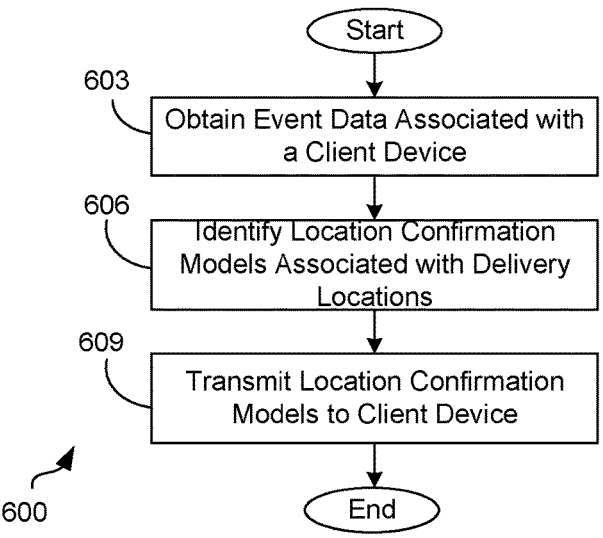
FIG. 6 is a flowchart illustrating one example of functionality implemented as portions of the confirmation service and the location confirmation engine are executed in a computing environment in the networked environment of FIG. 2 according to various embodiments of the present disclosure.

Referring next to FIG. 6, shown is a flowchart that provides one example of the operation of a portion of the confirmation service 218 (FIG. 2) according to various embodiments. It is understood that the flowchart of FIG. 6 provides merely an example of the many different types of functional arrangements that may be employed to implement the operation of the portion of the confirmation service 218 as described herein. As an alternative, the flowchart of FIG. 6 may be viewed as depicting an example of elements of a method implemented in the computing environment 203 (FIG. 2) according to one or more embodiments.

Beginning with box 603, the confirmation service 218 obtains event data 227 (FIG. 2) associated with a client device 103 (FIG. 1). For example, the client device 103 may be associated with a delivery agent and the event data 227 includes the different delivery locations that the delivery agent is scheduled to deliver items to during a predefined period of time (e.g., day, week, range of hours, etc.). In some examples, the confirmation service 218 can obtain the event data 227 upon a request to the client device 103. In other examples, the event data 227 may be stored in the data store 215 (FIG. 2) in association with the delivery agent data, device data, and/or other appropriate data. In this example, the confirmation service 218 may obtain the event data 227 in response to a request to the data store 215.

At box 606, the confirmation service 218 identifies the pretrained location confirmation models 115 (FIG. 2) that are associated with the delivery locations extracted from the event data 227. For example, the location confirmation models 115 are associated with location identifiers 241 (FIG. 2) for a given location. By being able to match the location identifiers 241 for the location confirmation models 115 with the location identifiers 241 included in the event data 227, the confirmation service 218 can identify the appropriate models.

At box 609, the confirmation service 218 transmits the identified pretrained location confirmation models 115 for the different locations to the client device 103. Transmitting the location confirmation models 115 in advance and in batch to the client device 103 can reduce the processing time and reduce network traffic associated with each delivery confirmation action performed by the client device 103. Thereafter, this portion of the process proceeds to completion.

Figure 7:
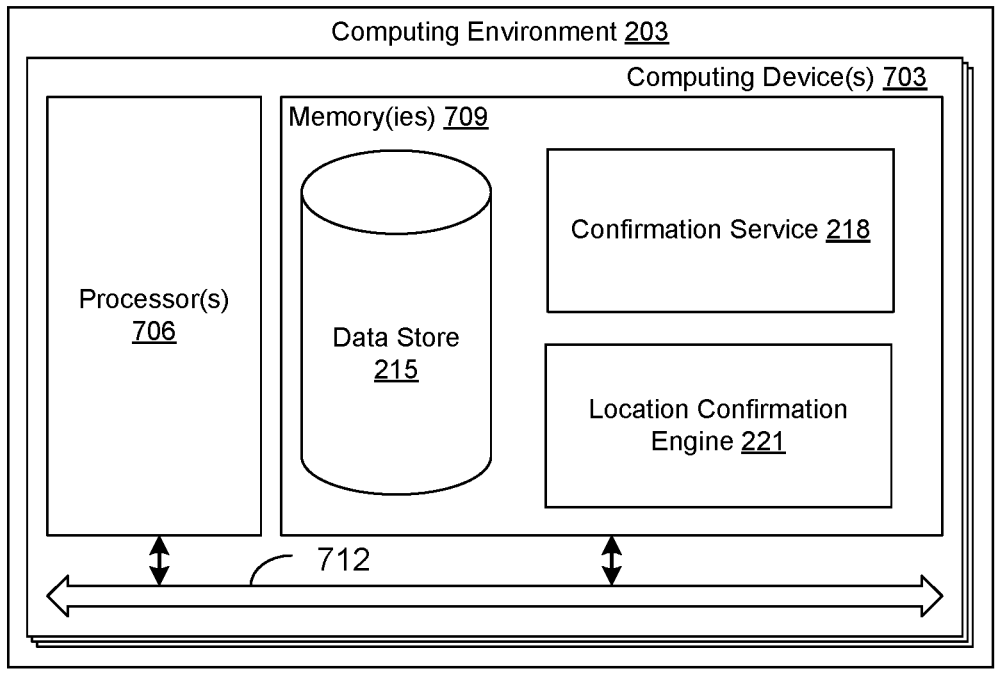
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 703. Each computing device 703 includes at least one processor circuit, for example, having a processor 706 and a memory 709, both of which are coupled to a local interface 712. To this end, each computing device 703 may comprise, for example, at least one server computer or like device. The local interface 712 may comprise, for example, a data bus with an accompanying address/control bus or other bus structure as can be appreciated.

Stored in the memory 709 are both data and several components that are executable by the processor 706. In particular, stored in the memory 709 and executable by the processor 706 are a confirmation service 218, a location confirmation engine 221, and potentially other applications. Also stored in the memory 709 may be a data store 215 and other data. In addition, an operating system may be stored in the memory 709 and executable by the processor 706.

Figure 8:
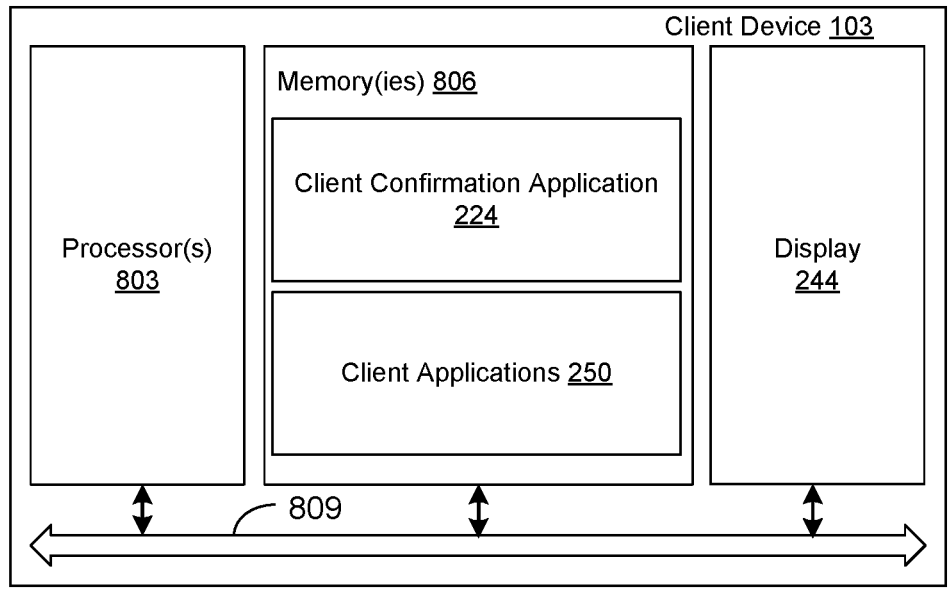
FIG. 8 is a schematic block diagram that provides one example illustration of a client device employed in the networked environment of FIG. 2 according to various embodiments of the present disclosure.

With reference to FIG. 8, shown is a schematic block diagram of the client device 103 (FIG. 1) according to an embodiment of the present disclosure. The client device 103 includes at least one processor circuit, for example, having a processor 803 and a memory 806, both of which are coupled to a local interface 809. The local interface 809 may comprise, for example, a data bus with an accompanying address/control bus or other bus structure as can be appreciated. A display 244 may also be coupled to the local interface 809.

Stored in the memory 806 are both data and several components that are executable by the processor 803. In particular, stored in the memory 806 and executable by the processor 803 are client applications 250, a client confirmation application 224, and potentially other applications. Also stored in the memory 806 may be a data store and other data. In addition, an operating system may be stored in the memory 806 and executable by the processor 803.

Referring now to both FIGS. 7 and 8, it is understood that there may be other applications that are stored in the memory 709, 806 and are executable by the processor 706, 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 709, 806 and are executable by the processor 706, 803. In this respect, the term "executable" means a program file that is in a form that can ultimately be run by the processor 706, 803. Examples of executable programs may be, for example, a compiled program that can be translated into machine code in a format that can be loaded into a random access portion of the memory 709, 806 and run by the processor 706, 803, source code that may be expressed in proper format such as object code that is capable of being loaded into a random access portion of the memory 709, 806 and executed by the processor 706, 803, or source code that may be interpreted by another executable program to generate instructions in a random access portion of the memory 709, 806 to be executed by the processor 706, 803, etc. An executable program may be stored in any portion or component of the memory 709, 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 709, 806 is defined herein as including both volatile and nonvolatile memory and data storage components. Volatile components are those that do not retain data values upon loss of power. Nonvolatile components are those that retain data upon a loss of power. Thus, the memory 709, 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 706, 803 may represent multiple processors 706, 803 and/or multiple processor cores and the memory 709, 806 may represent multiple memories 709, 806 that operate in parallel processing circuits, respectively. In such a case, the local interface 712, 809 may be an appropriate network that facilitates communication between any two of the multiple processors 706, 803, between any processor 706, 803 and any of the memories 709, 806, or between any two of the memories 709, 806, etc. The local interface 712, 809 may comprise additional systems designed to coordinate this communication, including, for example, performing load balancing. The processor 706, 803 may be of electrical or of some other available construction.

Although the confirmation service 218, the location confirmation engine 221, the client confirmation application 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the confirmation service 218, the location confirmation engine 221, and the client confirmation application 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 706, 803 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the confirmation service 218, the location confirmation engine 221, and the client confirmation application 224, that comprises software or code can be embodied in any non-transitory computer-readable medium for use by or in connection with an instruction execution system such as, for example, a processor 706, 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the confirmation service 218, the location confirmation engine 221, and the client confirmation application 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 703, or in multiple computing devices 703 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
 receiving, by at least one computing device, a plurality of wireless fingerprints collected from a plurality of client devices associated with a plurality of events at a given location;
 detecting, by the at least one computing device, a change in an infrastructure of a wireless environment at the given location based at least in part on an algorithm defined by a plurality of location confirmation rules;
 determining, by the at least one computing device, that the change in the infrastructure of the wireless environment is significant based at least in part on a confidence score meeting or exceeding a predefined threshold, the confidence score being based at least in part on a number of newly discovered access points and a number of removed access points from the plurality of wireless fingerprints;
 determining at least one of a date or a time associated with the change in the wireless environment;
 selecting a first subset of wireless fingerprints to be ignored when generating an updated location confirmation model based at least in part on a respective timestamp associated with a respective wireless fingerprint in the plurality of wireless fingerprints compared with the date or the time associated with the change in the infrastructure of the wireless environment; and
 generating, by the at least one computing device, the updated location confirmation model based at least in part on at least a second subset of the plurality of wireless fingerprints obtained following the change and selected based at least in part on a success of at least one delivery of a physical package at the given location.

2. The method of claim 1, wherein the plurality of wireless fingerprints are collected over a period of time in response to the plurality of events at the given location.

3. The method of claim 1, wherein detecting the change in the infrastructure of the wireless environment further comprises comparing a first set of wireless fingerprints of the plurality of wireless fingerprints used to generate the previously generated location confirmation model with a second set of wireless fingerprints of the plurality of wireless fingerprints.

4. The method of claim 3, further comprising:
generating the confidence score further based at least in part on the comparing of the first set of wireless fingerprints with the second set of wireless fingerprints.

5. The method of claim 1, further comprising:
receiving event data associated with a particular client device;
determining that the given location is included in the event data; and
transmitting the updated location confirmation model to the particular client device in response to determining that the given location is included in the event data.

6. The method of claim 1, wherein the wireless environment comprises a wireless fidelity (Wi-Fi) network, a Bluetooth network, a Zigbee network, or a Near Field Communication (NFC) network.

7. The method of claim 1, wherein individual wireless fingerprints of the plurality of wireless fingerprints comprise attribute data associated with a plurality of wireless access point devices located within a predefined area surrounding the given location.

8. The method of claim 7, wherein the attribute data comprises at least one of: a respective device identifier of a respective wireless access point device of the plurality of wireless access point devices, a wireless access point device location, and a signal strength of the respective wireless access point device.

9. The method of claim 1, wherein the change in the infrastructure of the wireless environment corresponds to at least one of a removal of or an addition of one or more wireless access point devices from the wireless environment.

10. A system, comprising:
at least one computing device; and
at least one application executable on the at least one computing device, wherein, when executed, the at least one application causes the at least one computing device to at least:
obtain a plurality of wireless fingerprints collected from a plurality of client devices associated with a plurality of events at a given location;
detect a change in an infrastructure of a wireless environment at the given location based at least in part on an algorithm defined by a plurality of location confirmation rules;
determine that the change in the infrastructure of the wireless environment is significant based at least in part on a confidence score meeting or exceeding a predefined threshold, the confidence score being based at least in part on a number of newly discovered access points and a number of removed access points from the plurality of wireless fingerprints;
determine at least one of a date or a time associated with the change in the wireless environment;
select a first subset of wireless fingerprints to be ignored when generating an updated location confirmation model based at least in part on a respective timestamp associated with a respective wireless fingerprint in the plurality of wireless fingerprints compared with the date or the time associated with the change in the infrastructure of the wireless environment; and
generate the updated location confirmation model based at least in part on at least a second subset of the plurality of wireless fingerprints obtained following the change and selected based at least in part on a success of at least one delivery of a physical package at the given location.

11. The system of claim 10, wherein the plurality of wireless fingerprints are collected over a period of time in response to the plurality of events at the given location.

12. The system of claim 11, wherein detecting the change in the infrastructure of the wireless environment further comprises comparing a first set of wireless fingerprints of the plurality of wireless fingerprints used to generate the previously generated location confirmation model with a second set of wireless fingerprints of the plurality of wireless fingerprints.

13. The system of claim 11, wherein, when executed, the at least one application further causes the at least one computing device to at least generate the confidence score further based at least in part on the comparing of the first set of wireless fingerprints with the second set of wireless fingerprints.

14. The system of claim 10, wherein, when executed, the at least one application further causes the at least one computing device to at least:
receive event data associated with a particular client device;
determine that the given location is included in the event data; and
transmit the updated location confirmation model to the particular client device in response to determining that the given location is included in the event data.

15. A non-transitory, computer-readable medium embodying program instructions that, when executed by a processor, cause at least one computing device to at least:
obtain a plurality of wireless fingerprints collected from a plurality of client devices associated with a plurality of events at a given location;
detect a change in an infrastructure of a wireless environment at the given location based at least in part on an algorithm defined by a plurality of location confirmation rules;
determine that the change in the infrastructure of the wireless environment is significant based at least in part on a confidence score meeting or exceeding a predefined threshold, the confidence score being based at least in part on a number of newly discovered access points and a number of removed access points from the plurality of wireless fingerprints;
determine at least one of a date or a time associated with the change in the wireless environment;
select a first subset of wireless fingerprints to be ignored when generating an updated location confirmation model based at least in part on a respective timestamp associated with a respective wireless fingerprint in the plurality of wireless fingerprints compared with the date or the time associated with the change in the infrastructure of the wireless environment; and
generate the updated location confirmation model based at least in part on at least a second subset of the plurality of wireless fingerprints obtained following the change and selected based at least in part on a success of at least one delivery of a physical package at the given location.

16. The non-transitory computer-readable medium of claim 15, wherein the plurality of wireless fingerprints are collected over a period of time in response to the plurality of events at the given location.

17. The non-transitory computer-readable medium of claim 16, wherein detecting the change in the infrastructure of the wireless environment further comprises comparing a first set of wireless fingerprints of the plurality of wireless fingerprints used to generate the previously generated location confirmation model with a second set of wireless fingerprints of the plurality of wireless fingerprints.

18. The non-transitory computer-readable medium of claim 17, wherein, when executed, the program instructions further cause the at least one computing device to at least generate the confidence score further based at least in part on the comparing of the first set of wireless fingerprints with the second set of wireless fingerprints.

19. The method of claim 1, wherein the second subset of the plurality of wireless fingerprints is selected further based at least in part on a recency of a collection of individual wireless fingerprints of the plurality of wireless fingerprints.

20. The system of claim 10, wherein the second subset of the plurality of wireless fingerprints is selected further based at least in part on a recency of a collection of individual wireless fingerprints of the plurality of wireless fingerprints.

* * * * *